H. COCKERILLE.
BUGGY SEAT.
APPLICATION FILED APR. 24, 1915.
1,185,482.
Patented May 30, 1916.
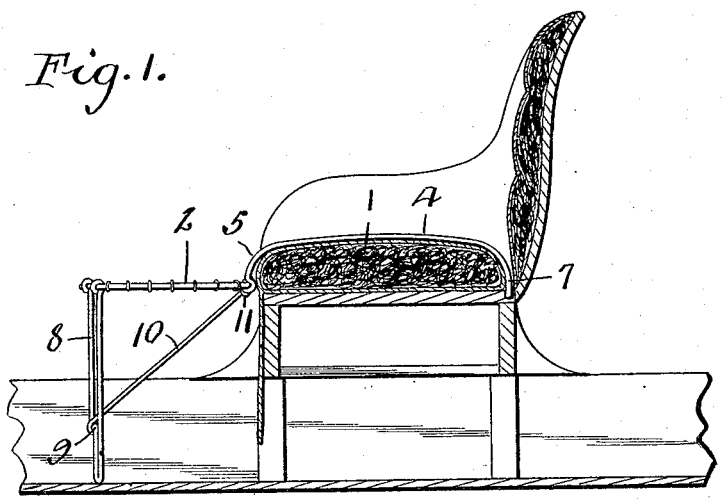
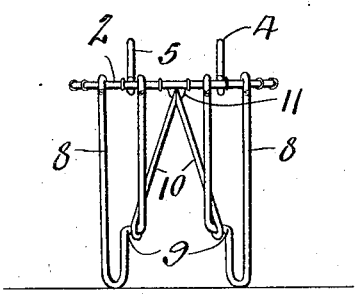
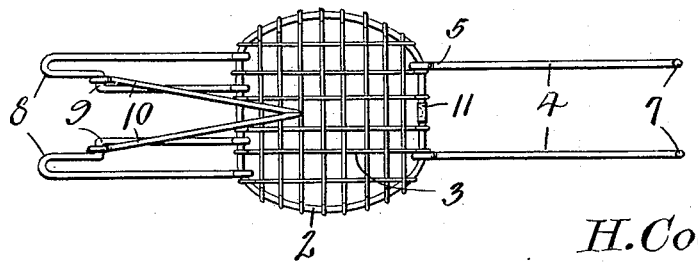
Inventor
H. Cockerille,
By Victor J. Evans
Attorney
Witnesses

UNITED STATES PATENT OFFICE.

HEVILA COCKERILLE, OF ROANOKE, VIRGINIA.

BUGGY-SEAT.

1,185,482.  Specification of Letters Patent.  Patented May 30, 1916.

Application filed April 24, 1915. Serial No. 23,680.

*To all whom it may concern:*

Be it known that I, HEVILA COCKERILLE, a citizen of the United States, residing at Roanoke, in the county of Roanoke and State of Virginia, have invented new and useful Improvements in Buggy-Seats, of which the following is a specification.

This invention relates to seats and more particularly to auxiliary buggy seats.

The principal object of the invention is the provision of an inexpensive, durable and substantial device which may be conveniently carried in the buggy or other similar vehicle and which may be as readily set up into operative position for occupancy by a third person.

It is very often found extremely expedient to have an additional seat on a buggy built for two people only and to this end the invention is designed for the purpose of supplying an additional seat which is partially supported by the regular seat of the buggy and additionally supported by foldable legs braced to the auxiliary seat in such manner that the legs may be extended in a plane with the auxiliary seat so that the whole device will lie flat in the bottom of the buggy and occupy small space.

It is, therefore, the object of this invention to provide a seat of this character which may be readily set up as aforesaid.

Further objects of the invention will appear as the following description is read in connection with the accompanying drawing, which forms a part of this application, and in which:—

Figure 1 is a side elevation showing the regular buggy seat in cross section and with the auxiliary seat set in operative position Fig. 2 is a front elevation. Fig. 3 is a bottom plan view showing the parts in the position occupied when adapted to be stored in the bottom of a buggy.

In the specific embodiment of the invention as illustrated herein, I have shown a seat adapted to be partially supported upon an ordinary buggy seat 1 and which consists essentially of a seat frame preferably circular in outline and indicated at 2. This seat frame may be constructed in any suitable manner or of any suitable material but is preferably formed of stamped sheet metal having a bottom 3 constructed of woven wire or any other suitable material. Secured to the back of the seat frame and extending rearwardly therefrom in parallel relation are supporting arms 4 each of which are offset vertically adjacent the seat frame, as shown at 5, to accommodate the cushion of the buggy seat and are bent downwardly at their rear ends in the form of hooks 7 which engage behind the seat cushion and preferably in apertures formed in the cushion support. Hinged to the front portion of the seat frame 2 are a pair of legs 8 preferably constructed of heavy wire and having one portion of their inner strands or stretches provided with a lateral offset 9 upon which is pivoted the brace bars 10. These brace bars converge, as shown, and may be formed of one piece of material, as is illustrated, and this material may, if desired, be of the same stock from which the legs 8 are formed. The connected ends of the brace bars 10 are arranged to engage in a clip 11 or other suitable fastening device so that when the legs 8 are arranged at right angles to the plane of the seat frame they will be held in such position against accidental displacement. The brace bars may be readily removed from the clip or other fastening device and spread out in a plane with the seat frame 2 or substantially parallel thereto and the entire device placed upon the bottom of the buggy body where it occupies small space.

What is claimed is:—

1. An auxiliary seat for vehicles comprising a seat frame having a seat therein, a pair of legs hinged to the forward portion of the seat frame, a pair of supporting arms projecting from the rear portion of the seat frame, and bracing means connected to the legs and detachably engaged with the seat frame.

2. An auxiliary seat for vehicles comprising a seat frame having a seat thereon, hooked arms projecting from one side and adapted to engage over the seat of the vehicle, a supporting leg hinged to the opposite side of the seat frame and arranged to lie at right angles to said seat frame or in a substantial plane therewith, and a brace hinged to the leg and detachably engaged with the seat frame.

3. An auxiliary seat for vehicles comprising a seat frame having a seat thereon, an arm projecting from one side of and in a substantial plane with the seat frame and arranged to rest upon the vehicle seat, a supporting leg hinged to the opposite side of the frame, and a brace hinged to the supporting leg and adapted to removably engage the seat frame.

In testimony whereof I affix my signature in presence of two witnesses.

HEVILA COCKERILLE.

Witnesses:
M. H. DAVIS,
J. L. EAST.

Copies of this patent may be obtained for five cents each, by addressing the "Commissioner of Patents, Washington, D. C."